Dec. 8, 1925.
L. CAMMEN
1,565,007
MOLD FOR CENTRIFUGAL CASTING
Filed March 13, 1925
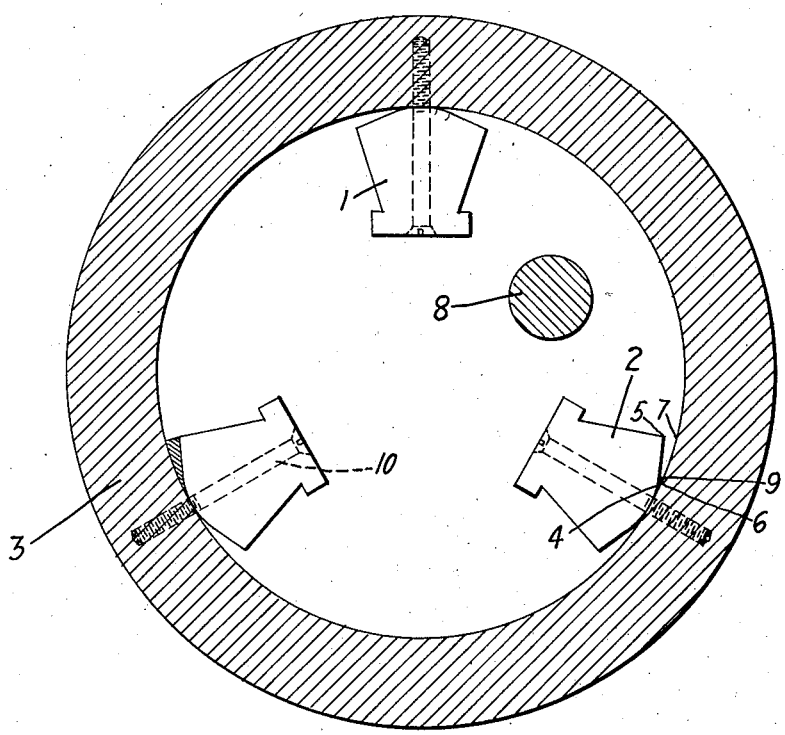
INVENTOR
Leon Cammen Patented Dec. 8, 1925.

1,565,007

UNITED STATES PATENT OFFICE.

LEON CAMMEN, OF NEW YORK, N. Y.

MOLD FOR CENTRIFUGAL CASTING.

Application filed March 13, 1925. Serial No. 15,27.

*To all whom it may concern:*

Be it known that I, LEON CAMMEN, a citizen of the United States, and residing in the borough of Manhattan, in the city, county, and State of New York, have invented certain useful Improvements in Molds for Centrifugal Casting, of which the following is a specification.

The present invention refers to an improvement in molds for centrifugal casting, in particular those provided with dividing bars, such as are used for the production of ingots, billets, sheet bars and the like.

The illustration shows a section of the mold in a plane normal to the axis of rotation.

The inner surface of molds for the centrifugal casting of tubes is simple to make, as it is merely a cylinder, and can be bored to finish size and shape in the usual lathe or boring mill. Difficulties in making molds arose however lately, with the development of the comparatively new art of casting centrifugally, in a horizontal mold, ingots, sheet bars and the like. Such molds require dividing bars or lugs, such as 1 and 2, to separate the individual ingots (cp. The Foundry Trade Journal, August 28, 1924, p. 178, and Iron Age, June 26, 1924, p. 1857).

These dividing bars may be machined out of the same stock as the rest of the mold, or may be made out of separate pieces of metal. In the former of these two cases the trouble which this invention contemplates to obviate, does not occur, but where the dividing bars are made of separate pieces, and merely attached to the mold by some means, such as bolting, screwing, or edge welding, the following trouble may occur.

As molten metal, such as steel, is poured into the mold and as it then freezes, its heat is mainly carried off by the metal of the mold and the metal of the bars (some heat being also lost by radiation and convection through the air). The mold is however a very large body of metal as compared with the dividing bars, and it is obviously very important that as much heat as possible should be handled by the mold, and as little as possible by the bars. The only way to accomplish this is to permit an easy flow of heat from the bars to the mold. It has been found however that a flow of heat between two bodies of metal occurs easily only when there is a molecular continuity between the bodies, i. e. when they are united by a body of metal, such as may be produced by welding, soldering or brazing. On the other hand, where the contact between the two bodies of metal is a purely mechanical one, as in bolted or riveted joints, the flow of heat between the two bodies of metal is very poor even when the surfaces seem to fit together extremely well.

Applying the above reasoning to the case of molds for centrifugal casting, it should be borne in mind that these molds may be of very large dimensions, such as 100 in. inside diameter, and 16 ft. long, while the bars may be 8 to 10 in. wide at the bottom, and that the life of such molds in casting steel is at best comparatively short which makes it imperative to be able to produce the molds at a fairly low cost, which means that only a very rough fit can be attempted between the dividing bars and the barrel of the mold 3. But if a mold were used with such a rough fit between the dividing bars and the barrel of the mold, the bars would become rapidly overheated, might warp all out of shape, and cause twisting and possibly cracking of the mold, and bring about other troubles.

What is necessary therefore is a means for establishing at a reasonable cost a complete all-metal path for the flow of heat from the bars to the barrel of the mold, such as might be provided by soldering or brazing. Neither soldering nor brazing can be used, however, where a high temperature metal like steel is cast. With wide bars welding cannot be used either for obvious reasons, and of course where it can be used conveniently and cheaply, it might not be necessary to resort to the employment of the present invention, the selection between the two methods being a matter which any may skilled in the art can decide for himself.

In the present invention the dividing bar is finished without any attempt at producing a good fit between it and the barrel; on the contrary, it is rather advisable to make the fit poor, somewhat like that shown in the drawing. The next step is to paint or varnish all the surfaces of the interior of the barrel and of the bars, except those corresponding to those between 4 and 5 on the bars, and those between 6 and 7 on the barrel. The barrel is then closed at both ends, filled with a proper electrolyte, a metallic anode 8 is introduced, and current is applied in such a manner as to deposit a metallic layer between the bar and the barrel of the mold. The metal need not necessarily be the same as that of the bars or barrel of the mold. It may not always be possible to produce a perfect deposit between the bar and the barrel in the sense that there may remain places, as for example, between 4 and 9, where the deposit would be poor, but this is immaterial as long as enough deposited metal is available to carry all the heat from the bar into the barrel of the mold in a manner to equalize their temperatures. The tips of the bars, such as 5, may be then spot-welded to the barrel if desired.

As centrifugal casting of objects other than tubes is, commercially, a new art, its terminology is still vague, and the parts which have been here referred to as "dividing bars", are also described as "partition lugs", "shapes", "projections", etc.

I claim:

1. A mold for centrifugal casting equipped with projection lugs made of pieces different from the barrel of the mold wherein the lugs are secured to the barrel by a continuous metallic joint.

2. A mold for centrifugal casting equipped with projection lugs made of pieces different from the barrel of the mold wherein the lugs are secured to the barrel by a continuous metallic joint, and the tips of the lugs are welded to the barrel.

3. A mold for centrifugal casting consisting of a barrel, projection lugs and metallic joints between said barrel and lugs consisting of electrodeposited metal.

4. A mold for centrifugal casting consisting of a barrel, projection lugs and metallic joints between said barrel and lugs consisting of electrodeposited metal, the tips of the lugs being welded to the barrel.

Signed in New York, in the county and State of New York, February 16, 1925.

LEON CAMMEN.